United States Patent
Pirzadeh (10) Patent No.: US 6,624,964 B1
(45) Date of Patent: Sep. 23, 2003

(54) METHOD AND APPARATUS FOR REDUCING SEEK ACOUSTICS IN DISK DRIVES FOR AV SYSTEMS

(75) Inventor: Sean S. Pirzadeh, Palo Alto, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/468,745

(22) Filed: Dec. 21, 1999

(51) Int. Cl.$^7$ .............................................. G11B 5/596
(52) U.S. Cl. ................................................... 360/78.07
(58) Field of Search ............................... 360/75, 78.07, 360/48, 49

(56) References Cited

U.S. PATENT DOCUMENTS

| | | |
|---|---|---|
| 4,956,831 A | 9/1990 | Sarraf et al. |
| 5,005,089 A | 4/1991 | Thanos et al. ............ 360/77.08 |
| 5,291,110 A | 3/1994 | Andrews et al. |
| 5,465,034 A | 11/1995 | Andrews |
| 5,465,035 A | 11/1995 | Scaramuzzo |
| 5,638,267 A | 6/1997 | Singhose et al. ............ 364/148 |
| 5,657,179 A | 8/1997 | McKenzie |
| 5,668,680 A | 9/1997 | Tremaine ................. 360/78.07 |
| 5,696,647 A | 12/1997 | Phan et al. ............... 360/78.07 |
| 5,726,825 A | 3/1998 | Phan et al. ............... 360/78.07 |
| 5,751,513 A | 5/1998 | Phan et al. ............... 360/78.07 |
| 5,760,992 A * | 6/1998 | Phan et al. ............... 360/78.07 |
| 5,901,009 A | 5/1999 | Sri-Jayantha et al. ..... 360/78.07 |
| 6,075,665 A * | 6/2000 | Chainer et al. ................ 360/48 |
| 6,148,240 A | 11/2000 | Wang |
| 6,256,163 B1 * | 7/2001 | Schmidt et al. .......... 360/78.09 |

* cited by examiner

*Primary Examiner*—David Hudspeth
*Assistant Examiner*—Mitchell Slavitt
(74) *Attorney, Agent, or Firm*—Tejpal S. Hansra (57) ABSTRACT

Method for performing seek operations in a disk drive including at least one data disk having multiple concentric data tracks thereon, and a transducer radially moveable relative to said data tracks by an actuator during a seek operation from a starting track to a destination track. Upon receiving a request for a seek from starting track to a destination track, a seek profile is obtained to control application of current to the actuator based on the seek profile, wherein the seek profile includes actuator current level and transducer target velocity control values for the seek operation based on said starting and destination tracks, to achieve a desirable acoustic output. Actuator current is applied to the actuator as a function of the control to perform the seek operation.

42 Claims, 8 Drawing Sheets

METHOD AND APPARATUS FOR REDUCING SEEK ACOUSTICS IN DISK DRIVES FOR AV SYSTEMS

FIELD OF THE INVENTION

The present invention relates generally to servo methods and apparatus for use in disk drives, and more particularly, to methods and apparatus for reducing seek acoustics in disk drives.

BACKGROUND OF THE INVENTION

Disk storage devices generally include a plurality of data disks which rotate at a preselected speed via spindle motor, and an actuator for moving a head carrier that supports transducers (read/write heads), across the rotating disks to write data to or read data from concentric data tracks on the disks. The actuator moves the transducers in a substantially radial direction across the rotating disks in response to an input signal which controls supply of an electrical current to a motor in the actuator for governing the movement of the actuator, and therefore the transducers, towards destination tracks. The actuator may cause the transducer to accelerate, decelerate, or move at a constant velocity. The actuator current is arranged to generate torque that causes the actuator to rotate to a desired position for the actuator as required by a seek command.

To access a destination track, in a seek operation a transducer is moved radially across the tracks from a starting track to the destination track. Thereafter, the rotation of the disk moves a target block of the destination track under the transducer where data is written to or read from. The amount of time required for accessing that target block, or access time, includes the time spent for the seek operation in positioning a transducer over the destination track, settling time, and a rotational latency which is the time for the segment on the destination track to rotate under the transducer.

Decreasing the access time increases the disk data throughput. In order to reduce access time, conventional disk drives utilize a velocity profile for controlling application of seek currents to the actuator to rapidly move the transducer across the disk to minimize access time. Typically, the transducer is moved between data tracks by supplying seek currents to the actuator to initially accelerate the transducer from the starting track up to a maximum target velocity and then decelerate the transducer to the destination track.

However, the transition from acceleration to deceleration in conventional disk drives is generally defined by a sudden change in the polarity of the actuator current from full power in one direction (e.g. positive) to full power in an opposite direction (e.g. negative). This rapid change in current exerts rapidly changing forces on the actuator, causing vibration of the actuator and the disk drive, and resulting in acoustical noise. The acoustical noise is highly undesirable. To reduce the vibrations and acoustical noise, in conventional disk drives a predetermined transducer radial velocity profile is stored in memory, wherein the velocity profile defines programmed actuator current levels for the seek operation to reduce acoustic noise for random seeks.

A disadvantage of such conventional disk drives is that the velocity profile is designed to minimize access time for random seeks in computer systems. This is particularly problematic where conventional disk drives are utilized for storage of Audio Visual/Video (AV) content in AV systems, such as in consumer electronics (e.g., Digital Video Recorders or DVRs). This is because certain AV disk drive access patterns (e.g. dual streaming due to simultaneous record and playback from the same disk) require non-random seeks that generate significantly higher acoustic noise than random seeks in computer systems. As such, conventional disk drives utilizing techniques for achieving acoustic noise reduction as measured for random seeks, do not meet the acoustic requirements of AV systems.

There is, therefore, a need for method and apparatus for reducing acoustical noise induced during seek operations in disk drives utilized for storage of AV content. There is also a need for such method and apparatus to reduce acoustic noise without throughput degradation for the disk drive. There is also a need for such method and apparatus to allow the use of the disk drive in AV applications as well as in computer.

BRIEF SUMMARY OF THE INVENTION

The present invention satisfies these needs. In one embodiment the present invention provides a method for performing seek operations in a disk drive including at least one data disk having multiple concentric data tracks thereon, and a transducer radially moveable relative to the data tracks by an actuator during a seek operation from a starting track to a destination track. Upon receiving a request for a seek, a seek profile is utilized to control application of current to the actuator based on the seek profile, wherein the seek profile includes actuator current control values, and can include transducer target velocity control values for the seek operation based on the starting and destination tracks, to achieve a desirable acoustic output. Actuator current is applied to the actuator motor as a function of the control values to perform the seek operation at or below the desired acoustic output.

In one embodiment, determining the seek profile includes the steps of: for a seek operation from a starting track to a destination track, determining an empirical actuator current control value that provides a desirable acoustic output from the disk drive in response to controlled application of current to the actuator motor as a function of the current control value; relating the current control value to the seek operation based on the seek length and location, wherein the seek length represents the distance between the starting and destination tracks, and the seek location represents the radial locations of the starting and destination tracks; and storing the current control value in a memory device, and thereafter, using the current control value to perform seek operations in the disk drive.

Determining the seek profile can further include the steps of: determining an empirical actuator/transducer target velocity control value that provides a desirable acoustic output for the disk drive in response to controlled application of current to the actuator motor as a function of the target velocity control value; relating the target velocity control value to the seek operation based on the seek length and location; and storing the target velocity control value in a memory device, and thereafter, using the current and target velocity control values to perform seek operations in the disk drive.

In another aspect, the present invention provides a disk drive apparatus comprising: at least one data disk having multiple concentric data tracks thereon; an actuator including an actuator motor; a transducer radially moveable relative to the data tracks by the actuator; a servo system including a seek profile, for generating actuator current commands to perform at least one seek operation from a starting track to a destination track, the seek profile including actuator current level and transducer target velocity control values for the seek operation in relation to the starting and destination tracks, to achieve a desirable acoustic output in response to controlled application of actuator input current to the actuator motor as function of the control values; and a driver coupled to the servo system and the actuator motor, wherein the driver is arranged to receive at least one current command value to generate an input current waveform to the actuator motor. The disk drive can be a component of an AV system.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
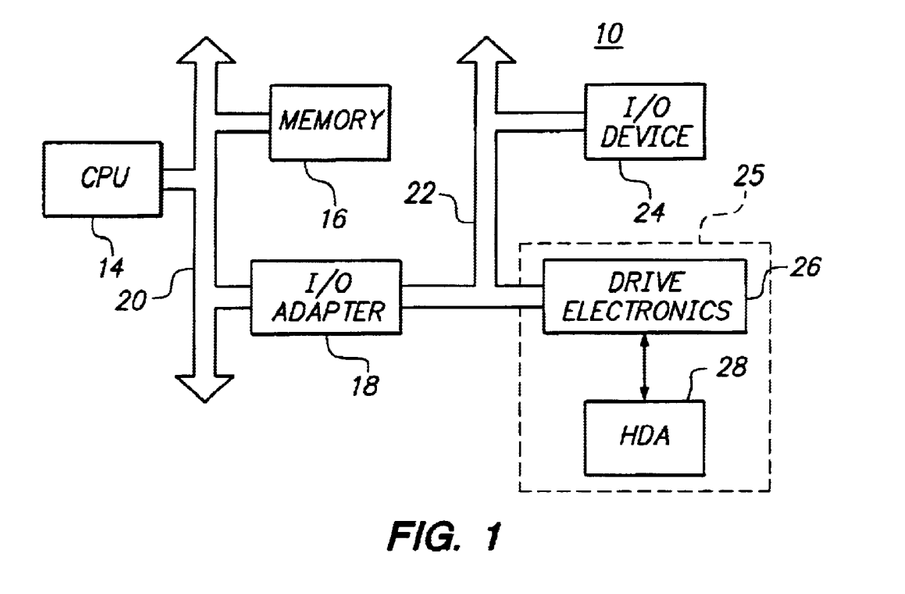
FIG. 1 is a block diagram of an embodiment of a system including a disk storage system according to the present invention.

Referring to FIG. 1, an example system 10 is shown to include a central processing unit ("CPU") 14, a main memory 16, and I/O bus adapter 18, all interconnected by a system bus 20. Coupled to the I/O bus adapter 18 is an I/O bus 22, that can be e.g. a small computer system interconnect (SCSI) bus, and which supports various peripheral devices 24 including a disk storage unit such as a disk drive 25. The disk drive 25 includes drive electronics 26 and a head disk assembly 28 ("HDA").

Figure 2:
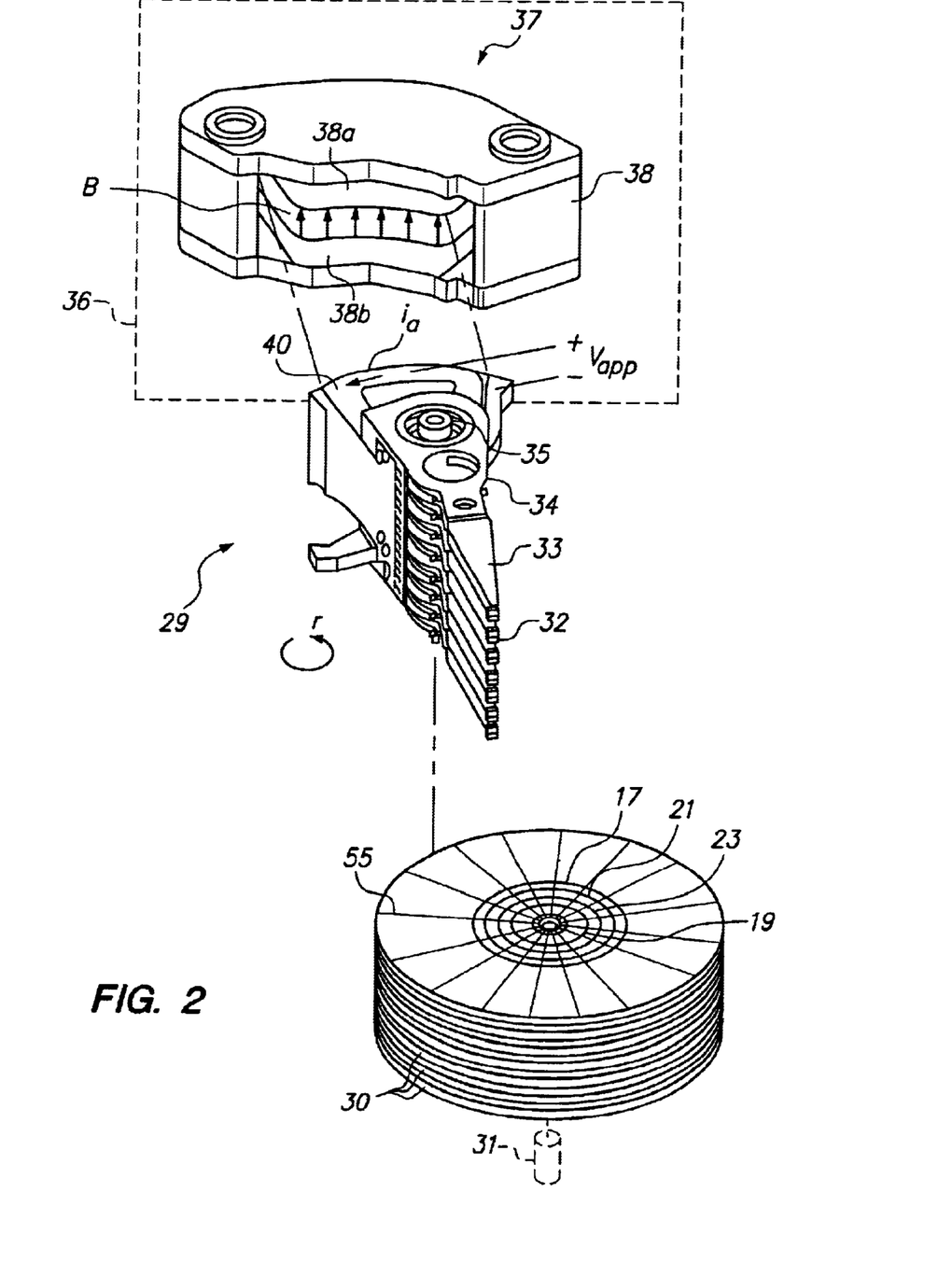
FIG. 2 is a mechanical assembly drawing of an embodiment of the head disk assembly of FIG. 1.

Referring to FIG. 2, in one embodiment the HDA 28 of FIG. 1 is shown to further include an actuator 29, and disks 30 rotated by a spindle motor 31, on which disk 30 data are stored. Data is stored on the disks 30 in concentric circular data tracks 17. Data is written and read from the disks 30 in a conventional manner via magnetic transducers 32 which are attached to flexible load beams 33 extending from actuator arms 34. The actuator arms 34 pivot about point 35 to move the load beams 33 in a radial direction over the storage surfaces of the disks 30 from a starting track 19 towards a destination track 21 shown in FIG. 2 by example. At the destination track 19, the magnetic transducers 32 can read from or write data to the disks 30. An actuator motor 36 controls the radial movement of the actuator arms 34 in proportion to an input signal.

The motor 36 is shown to include a magnet 37 containing two plates 38a, 38b coupled together via a pair of sidewalls to form a flat toroidal shaped member 38. A wire coil 40 is disposed between the two plates 38a and 38b. The magnet 37 generates a constant magnetic field B between the plates 38a and 38b. When an input current signal $I_a$ is induced in the coil 40 disposed in the magnetic field B, a torque Γ is produced on the actuator arms 34 resulting in radial motion of the arms 34 about pivot point 35. The polarity of the input current $I_a$ determines the direction of radial motion of the actuator arms 34.

Figure 3:
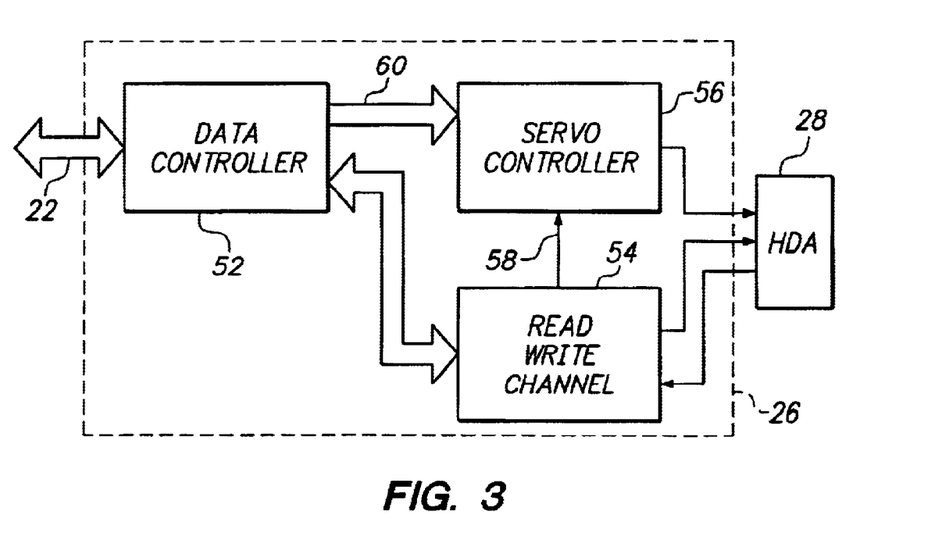
FIG. 3 is a block diagram of an embodiment of the drive electronics of FIG. 1.

Referring to FIG. 3, in one embodiment, the drive electronics 26 of FIG. 1 is shown to include a data controller 52, a read/write channel 54, and a servo controller 56. A typical data transfer initiated by the CPU 14 to the disk drive 25 may involve e.g. a DMA transfer of data from the memory 16 onto the system bus 20 (FIG. 1). Data from the system bus 20 is transferred by the I/O adapter 18 onto the I/O bus 22. The data is read from the I/O bus 22 by the data controller 52, which formats the data into blocks with the appropriate header information and transfers the digital data to the read/write channel 54.

The read/write channel 54 converts data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. Specifically, the concentric data tracks 17 on the storage surface of a data disk 30 are broken up and divided into segments by a multiplicity of regularly spaced apart embedded servo sectors 55 (FIG. 2). Each servo sector 55 includes head positioning information such as a track identification field for identifying the track address that includes the servo sector 55, and burst fields to provide servo fine position information, all for detecting the location of a transducer 32 in relation to that track. The head positioning information is induced into the transducer 32, converted from analog signals to digital data in the read/write channel 54, and transferred to the servo controller 56, wherein the servo controller 56 utilizes the head positioning information for performing seek and tracking operations of the transducer 32 over the disk tracks 17.

The data controller 52 also provides destination track position data on lines 60 to the servo controller 56. The destination track position data on lines 60 provides coarse positioning information to the servo controller 56 for specifying a seek length, wherein the seek length is the radial distance that the actuator arm 34 must move the transducer 32 from a starting/current track to reach the destination track to which the CPU 14 has requested access. The time period for the transducer to cross over the tracks between the starting track and the destination track in the seek length is the seek time. The servo controller 56 uses the seek length data on lines 60 and the servo head positioning information on lines 58 to generate in response, a current value $I_{COMMAND}$ to control supply of the input actuator current $I_a$ to the motor 36, resulting in controlled movement of the actuator arm 34, and therefore the transducer 32 as described below.

Figures 4, 7:
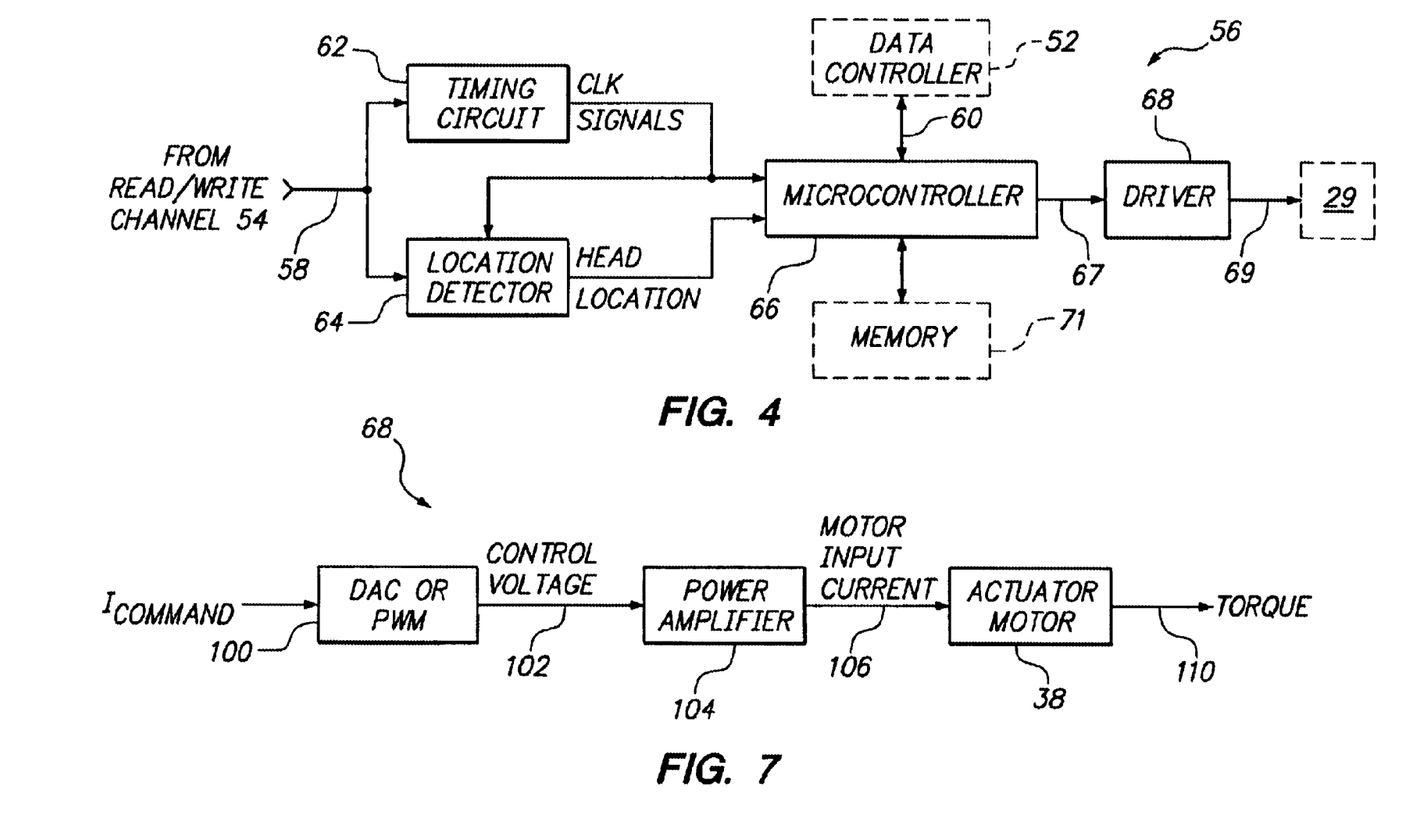
FIG. 4 is a block diagram of an embodiment of the servo controller of FIG. 3.
FIG. 7 is a block diagram representation of the driver of FIG. 4 used to generate torque using current commands.

Referring to FIG. 4, in one embodiment the servo controller 56 includes a timing circuit 62 to generate clock signals synchronized with the passage of servo sectors 55 on tracks under the transducer 32. The timing circuit 62 can include a counter and a phase locked loop (not shown) for generating the clock signals CLK. In response to the clock signals from the timing circuit 62, a location detector 64 detects transducer radial location from head position data provided by the read/write channel 54, as the head position information in each servo sector 55 of the rotating disk 30 pass under the moving transducer 32. The detected head position information in each servo sector 55 provides the address of the track which contains the servo sector 55, and therefore, the location of the transducer 32 relative to that track. The timing circuit 56 is synchronized with the read/write channel 54, and the location detector 64 receives the head position data from the read/write channel 54.

The servo controller 56 further includes a microcontroller 66 for controlling movement and positioning of the transducer 32 including for seek operations. In response to clock signals from the timing circuit 62, wherein each clock signal indicates passage of a servo sector 55 under the transducer 32, the microcontroller 66 obtains said transducer location information from the location detector 64. The microcontroller then utilizes the transducer location information in conjunction with the destination track data from the data controller 52, to generate said current value $I_{COMMAND}$ for moving and/or positioning the transducer 32. The current value $I_{COMMAND}$ from the microcontroller 66 is provided to a driver 68 on path 67, and the driver 68 supplies the input current $I_a$ to the actuator 29 on path 69 in proportion to the current value $I_{COMMAND}$ up to a maximum current supply capability of the driver 68. When the current $I_a$ is applied to the motor 36, the arm 34 moves radially inward or radially outward to perform a seek operation.

For moving the transducer 32, in one embodiment a feed current value FC is calculated by the microcontroller 66 to provide a base current value, depending upon the seek characteristics such as the seek length. The feed current value FC is an a priori prediction of current expected to be required to carry out the seek. It is based on information which quantify the operating characteristics, some of which are developed during initialization calibration routines, and can be stored in memory. The feed current value FC allows more accurate adherence to a desired seek trajectory. Fundamentally, a nominal current waveform is preestablished for each seek length. The feed current value FC corresponds to the actuator current $I_a$ needed to keep the heads 32 on the idealized trajectory.

Figure 5:
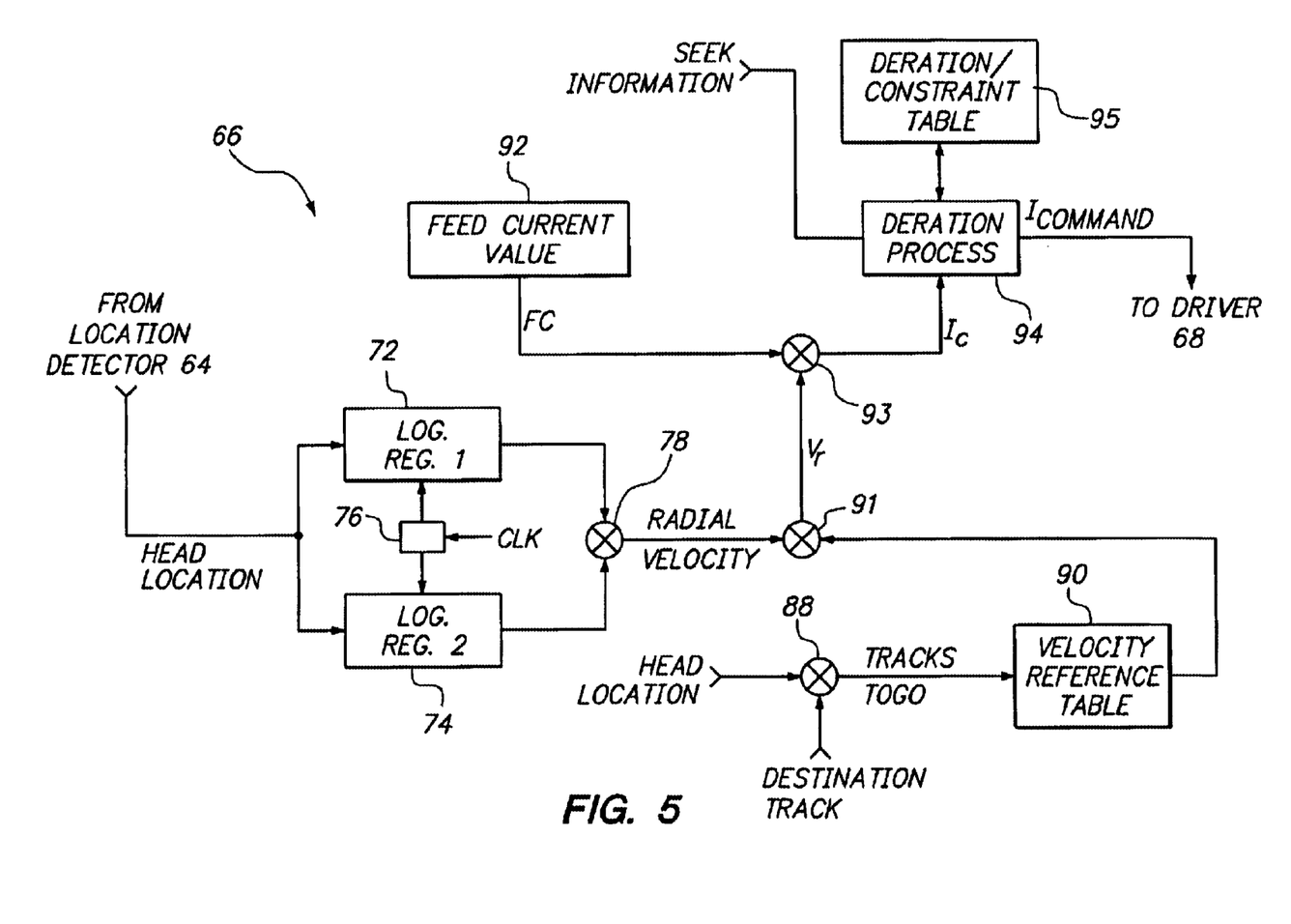
FIG. 5 shows an architectural model block diagram of the servo controller of FIG. 4 operating from a seek profile and transducer motion information in track seeking operations.

FIG. 5 depicts an example model of the servo architecture of the microcontroller 66 as configured by process steps according to the present invention to perform seek operations according to a seek profile including a priori feed current values FC and current and velocity control values as described below. The current control values can include: (1) actuator current levels, (2) deration values for the actuator current, or (3) constraints such as maximum actuator current value, Etc. Similarly, the target velocity control values can include: (1) target velocity levels, (2) deration values for the transducer target velocity, or (3) constraints such as maximum target velocity, Etc.

Referring to FIGS. 4–5, a priori feed current values FC for the basic current corresponding to the seek length are calculated based on seek information which can reside in e.g. memory 71. In one example, the feed current values FC are stored in memory as a FC look-up table of entries, wherein each entry includes a current value FC, indexed by a distance between the transducer location and the destination track. The microcontroller 66 uses the distance between the transducer location and the destination track to obtain a corresponding FC value from the FC look-up table. In another example an actuator current profile is predetermined and provides the amount of actuator current per distance from the destination track. A predetermined look-up table specifies the expected transducer velocity per distance from the destination track. As such, for each detected transducer location, the detected radial velocity is subtracted from the corresponding expected radial velocity. The difference is then used to adjust the profile current value for that detected transducer location to provide the feed current values FC. An example of such a process is described in the commonly assigned U.S. Pat. No. 5,005,089, titled "High performance, high capacity micro-Winchester disk drive", incorporated herein by reference.

In one embodiment, the microcontroller 66 calculates the radial velocity of the transducer 32 as the number of tracks crossed over by the transducer 32 in between two sampling intervals, wherein a sampling interval is defined by a servo sector 55 passing under the transducer 32. As such, during each sampling interval, the transducer location is detected, and the microcontroller 66 calculates the radial velocity of the transducer 32 by determining a difference in the number of tracks between: (1) a first transducer location detected during a present sampling interval, and (2) a second transducer location detected during a preceding sampling interval. Referring to FIG. 5, in an example implementation, successive transducer location values are alternately latched in first and second location registers 72, 74 by latching signals from a flip-flop control 76 in response to clock signals CLK from the timing circuit 62.

As such, in one scenario, the second transducer location detected during said preceding sampling interval is stored in the second location register 74, and the first transducer location detected during the present sampling interval is stored in the first location register 72. The track difference between the two transducer locations in registers 72, 74 is determined in a difference junction 78. The output of the junction 78 is the number of tracks crossed over by the transducer 32 between the two sampling intervals, providing a measure of the radial velocity of the transducer 32. The radial velocity can be expressed as tracks crossed over per sampling interval (i.e. tracks/sample). For example, if the transducer 32 crosses over one hundred tracks between two servo sectors, then the radial velocity of the transducer 32 is one hundred tracks per sampling interval, or one hundred tracks/sample.

Further, in a difference junction 88 the transducer location and destination track are subtracted to determine a total number of tracks remaining to be crossed and the resultant value is applied to address an appropriate trajectory value stored in a trajectory profile look-up table 90 in the external memory 71. A ratio value, Vr, of actual velocity value from the junction 78 and the reference velocity value from the table 90 is calculated in a junction 91 in order to normalize the difference between the actual velocity and the reference velocity irrespective of magnitude thereof. The feed forward current value FC is calculated by the microcontroller 66 at a process 92 to provide a base current value, depending upon the seek characteristics (e.g., seek length, and radial location of the starting and/or the destination tracks). The feed forward value FC allows more accurate adherence to the desired seek trajectory for a given velocity servo loop bandwidth. Basically, a nominal current waveform is pre-established for each seek length. The feed forward waveform value FC corresponds to the actuator current needed to keep the transducer 32 on the idealized trajectory. The normalized, signed velocity signal Vr is added to the feed forward value FC in a process 93 to correct for any deviations from the reference trajectory due to friction, torque constant variation, etc.

Figure 6A:
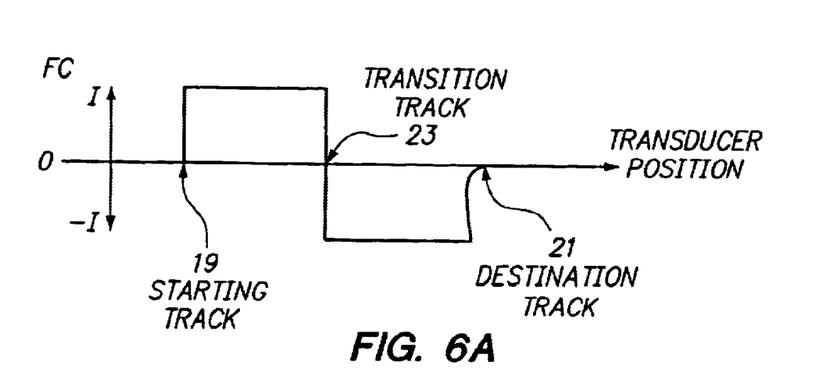
FIG. 6A is an example graph of a seek mode feed current waveform vs. transducer position, generated within the drive electronics of FIG. 3.

An example of a feed forward waveform value FC vs. track position for a seek length is set forth as FIG. 6A and illustrates an initial positive full current increment for causing acceleration away from a starting track 19 until the transducer 32 reaches a maximum target velocity at a transition track 23 between the starting track 19 and the destination track 21, a zero current increment for a coast interval and then a negative 80% current increment for deceleration toward the destination track 21. Resultant velocity is graphed as FIG. 6B.

In another example, the feed forward current value FC may be an initial full current in order to command maximum torque until either e.g. 43 inches per second of limit velocity (FIG. 6B) is reached at which point a zero current value coast increment is followed or the decelerate switch point, depending upon the initialization information. During coasting mode, a substantially constant velocity of e.g. 43 inches per second is maintained. The transition or switch point detection process compensates for the inductance of the actuator by switching to deceleration current mode approximately one millisecond in advance of convergence of measured velocity and the switch point of the reference velocity trajectory FC. This look-ahead approach minimizes overshoot of the actuator trajectory. The switch point velocity can be recalculated from the command velocity FC for each servo phase in the accelerate mode.

Figure 6B:
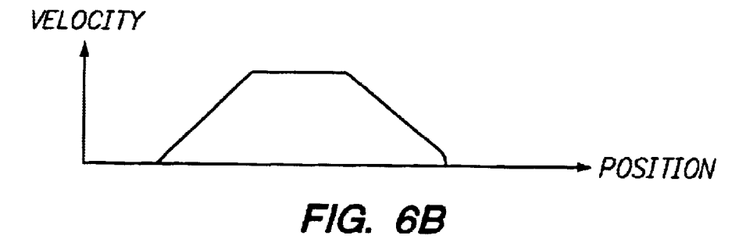
FIG. 6B is a graph of example resultant transducer velocity due to application of the feed current of FIG. 6A to the actuator motor.

After the transition track is reached, the feed forward current waveform value FC may switch to a reverse current which is e.g. 80 percent of the full current, and this reverse current is applied until the actuator reaches the vicinity of the destination track and its velocity has slowed to almost zero (FIG. 6B). During accelerate, coast and decelerate modes the velocity servo loop is closed and feedback corrects the trajectory.

The normalized error signal Vr is added to the a priori feed forward value FC at the process 93 which yields an actuator current command value $I_c$. According to one embodiment of the present invention, the current value Ic is selectively controlled (e.g., derated) in a process 94 to generate the current value $I_{COMMAND}$ such that the acoustic noise in the seek operation is reduced to a desired level. The current value Ic is controlled as a function of the radial location of the starting and the destination tracks (seek/stroke location) of the seek, and the distance between the starting and the destination tracks (seek length). The deration process 94 includes the steps of providing one or more actuator current level deration values or constraints and one or more transducer target velocity deration values or constraints for a seek operation, such that controlled application of the actuator current as function of the deration values or constraints achieves desirable acoustic output from the disk drive for the seek operation, described further below.

Referring back to FIG. 5, the current command $I_{COMMAND}$ from the deration process 94 is fed to the driver 68 to generate the actuator input current $I_a$. FIG. 7 shows an example block diagram of an embodiment of the driver 68 used to generate torque in response to the current command $I_{COMMAND}$. In the driver 68, the current command $I_{COMMAND}$ is sent to a digital-to-analog (D/A) converter or a pulse width modulator (PWM) 100, to generate a control voltage 102 proportional to the current command $I_{COMMAND}$, numerically. The D/A converter 100, in turn, feeds the control voltage 102 into a power amplifier 104. The power amplifier 104 processes, e.g., amplifies, the current command $I_{COMMAND}$ to generate a motor input current 106 (seek current $I_a$). Motor input current 106 is effectively arranged to produce a torque 110 that causes the actuator 29 to move the heads 32. Specifically, the motor input current 106 causes the actuator motor 38 to create torque 110 that moves the transducer 32 to a desired location. Torque 110 may cause the actuator 29 to accelerate, decelerate, or move the heads 32 at a constant velocity. The motor input current 106 is arranged to generate torque 110 that causes the actuator 29 to rotate the heads 32 to a desired position as required by the seek command. The profile of the motor input current 106 is dependent upon the profile of the current command $I_{COMMAND}$.

Figure 8A:
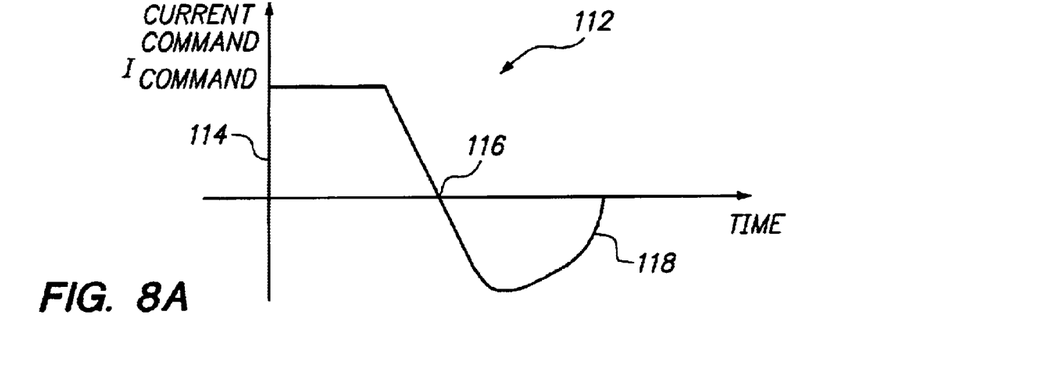
FIG. 8A is a graphical representation of a relationship between a current command and time.

FIG. 8A Is a graphical representation of a relationship between an example of the current command $I_{COMMAND}$ in FIG. 7 and time. The current command has a profile 112 which effectively has an infinite "beginning" slope 114, or an acceleration phase. Beginning slope 114 is approximately infinite because a rapid increase from zero current to a current level which saturates the power amplifier 104 allows the seek time, i,e., the time associated with a seek operation, to be minimized. The power amplifier 104 is operated at saturation, or in saturation mode, to minimize the seek time associated with performing a seek. In additional to the beginning slope 114, the current command profile 112 includes a "change in polarity" section 116, followed by an ending deceleration section 118, both of which are associated with gradually returning profile 112 to a level of zero current, thereby ending the seek.

Figure 8B:
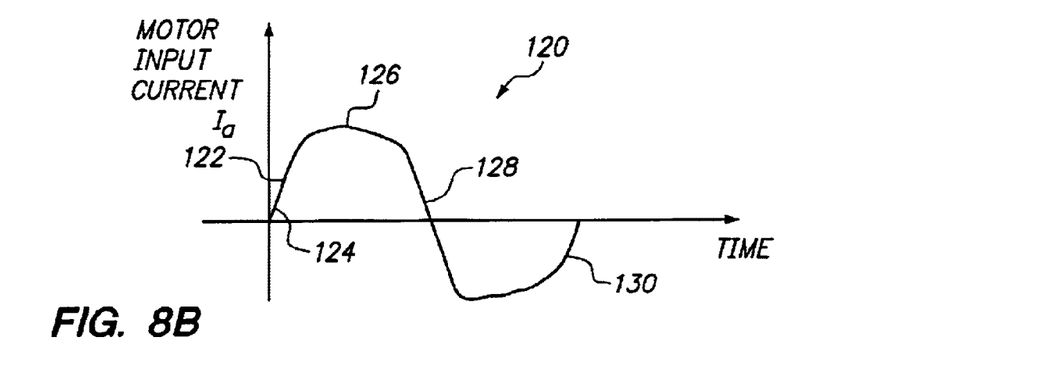
FIG. 8B is a graphical representation of a relationship between an input current to the actuator motor, generated by the current commands as shown in FIG. 8A, and time.
Figure 8C:
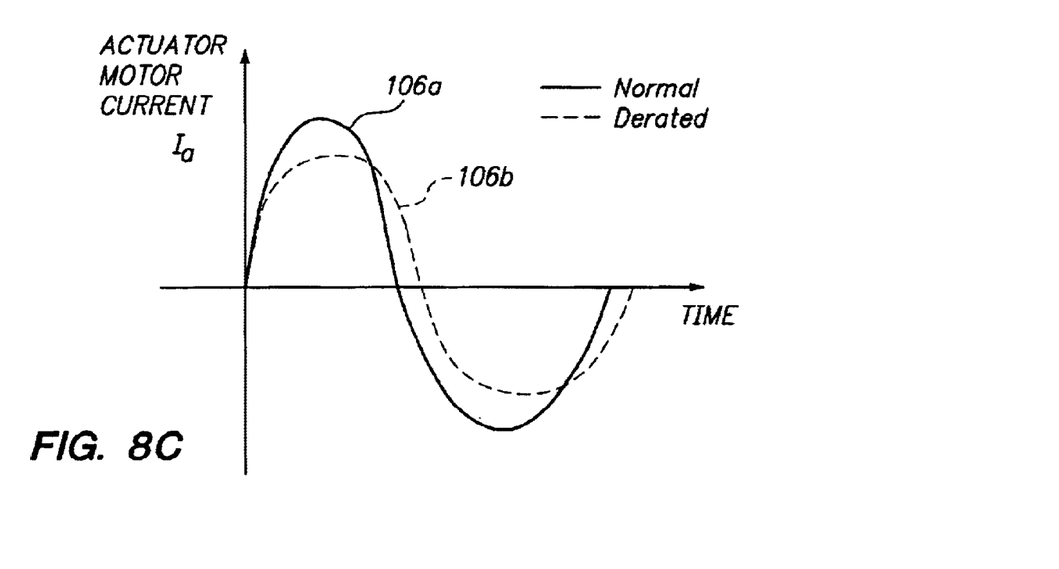
FIG. 8C is a graphical representation of examples for the actuator current profile according to Ic and the corresponding derated current command $I_{COMMAND}$, and time.

Referring to FIG. 8B, the seek current 106 ($I_a$) sent to an actuator motor 38 in response to the current command $I_{COMMAND}$ of FIG. 8A, is described. A profile 120 for the input current 106 is effectively a seek current, or a forcing function which causes the actuator 29 to move the heads 32. In this embodiment, a seek current is arranged to create a bang-bang seek, or a near bang-bang seek, wherein maximum current levels are used to create maximum torque levels to efficiently move the actuator. Input current profile 120 is generated when current command profile 112 is passed through the driver 68, and is used to create a torque in the actuator motor 38. A beginning section 122 of input current profile 120 is "rugged," i.e., has a relatively large slope. As shown beginning section 122, which is typically the one-third stroke seek, has a substantially exponential shape, after an initial sudden change of slope 124. Input current profile 120 reaches a maximum value 126 which corresponds approximately to the saturation level for the power amplifier 104 to generate the input current profile 120, given current command profile 112 of FIG. 8A. A "polarity reversal" section 128 of input current profile 120 signifies a transition from acceleration to deceleration. An ending section 130 signifies a final deceleration which causes the actuator 29 to decelerate the heads 32 and eventually return to rest. FIG. 8C is a graphical representation of an example profile 106a (solid line) for the input current $I_a$ 106 according to an underated Ic command, and a corresponding example profile 106b (broken line) for the input current $I_a$ 106 according to the derated Ic command (i.e., $I_{COMMAND}$). The current profile 106b shows deration in the maximum (positive/negative) values for Ic to provide desired seek acoustics.

To generate the current and velocity control values (e.g., deration values) comprising the actuator current and transducer target velocity deration values, in an iterative process, for each seek operation from a starting track to a destination track, an actuator current control value is determined which provides a desirable acoustic output for the disk drive 25 in response to controlled application of current $I_a$ to the actuator motor 36 as a function of the current control value. Similarly, for each seek operation a transducer target velocity control value is determined that provides a desirable acoustic output for the disk drive in response to controlled application of current $I_a$ to the actuator motor 36 as a function of the target velocity control value. Once the correlation between seek acoustics on the one hand, and the length and location of a seek are so determined, the correlation is utilized to control the actuator current and transducer velocity for a seek operation to achieve a desired acoustic level (e.g., below a certain maximum value). The amount of control of the actuator current and transducer target velocity can be selected based on the desired acoustic output of the disk drive 25.

In one example, the amount of deration, or limiting, of the maximum actuator current and transducer target velocity can be selected based on the desired acoustic output of the disk drive 25. The process of determining the deration factors for each seek operation can include selecting a particular actuator current level and then obtaining corresponding transducer target velocity (i.e., maximum target velocity is a function of maximum actuator current). The acceleration and deceleration actuator current profile and target velocity are based on the seek location. Conventionally, for a seek operation, the maximum actuator current value is determined as a function of transducer distance to the destination track to minimize seek time. According to the present invention, because seek acoustics are a function of stroke location (seek location), the maximum actuator current is controlled (e.g., derated) not only as a function of transducer distance to the destination track, but also as a function of the radial seek location and seek length.

Figure 9:
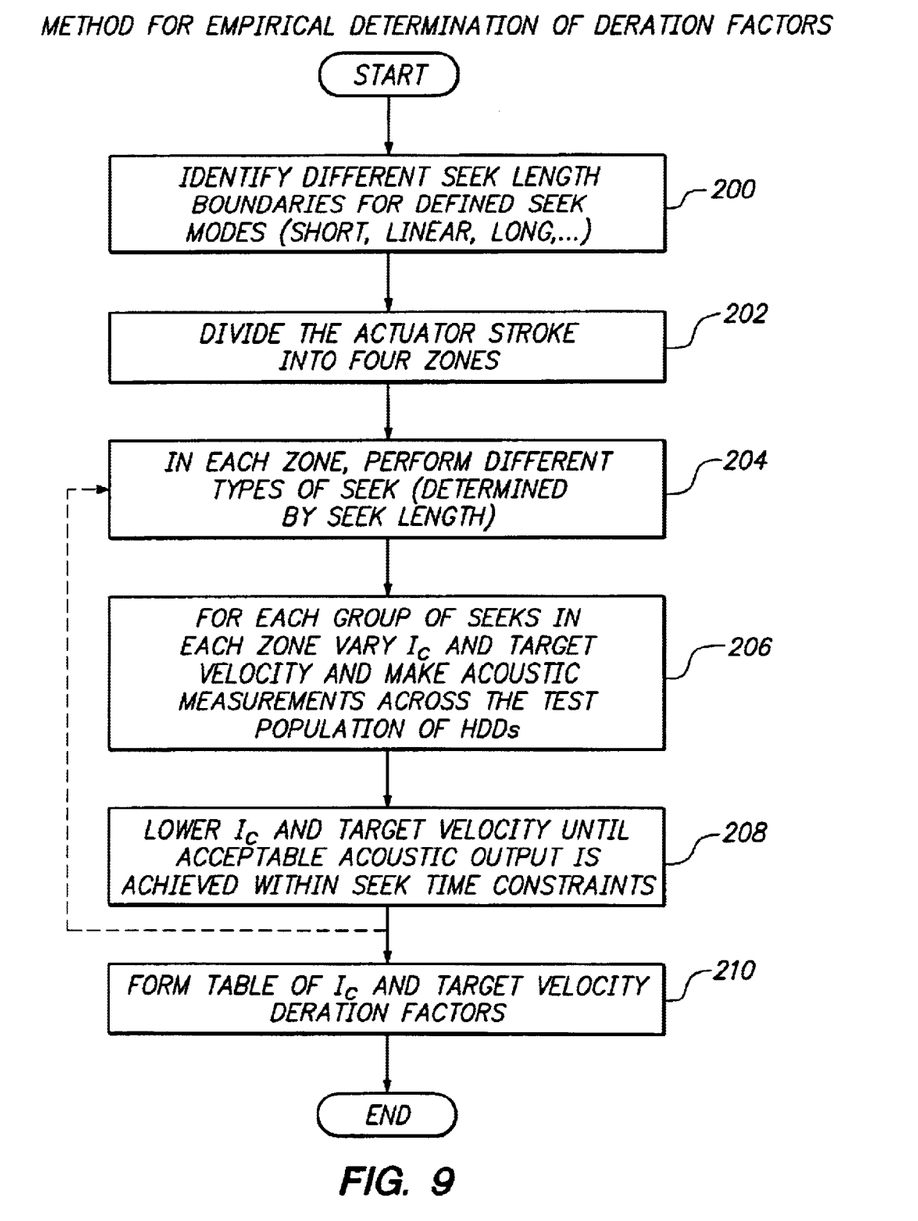
FIG. 9 shows a flow diagram of an embodiment of a process for empirical determination of current and velocity control values (e.g., deration values) for seek operations according to the present invention.

FIG. 9 shows a flow diagram of an example of the above process for empirical determination of current and velocity deration values for seek operations. The process begins by identifying different seek length boundaries for defined seek modes e.g., short, linear and long seeks (step 200). In one example, the actuator stroke is divided into e.g. four radial zones across the disk from the inner diameter to the outer diameter of the storage surface of the disk 30 (step 202). In each zone, one or more seek operations of different seek lengths are performed (step 204). For each group of seeks (determined by seek length) in each seek zone, Ic and transducer target velocity are varied and acoustic measurements made for several disk drives 25 (step 206). The Ic and target velocity are adjusted (e.g., lowered) until acceptable acoustic output is achieved within seek time requirements (step 208), and the corresponding Ic and target velocity values are stored as deration values (constraints) corresponding to a seek zone and seek length (step 210). The difference between the maximum current available for application to the actuator motor to accelerate the heads 32, and said current value obtained according to the above steps, represents the actuator current deration or constraint.

The actuator current level and target velocity deration values (or constraints such as maximum levels) are related to each corresponding seek operation based on the seek length and location (e.g., zone). In one embodiment, the actuator current and target velocity deration values are related to corresponding seek length and location values by storing the deration values in at least one two dimensional look-up table 95 in the memory 14, and thereafter used to derate the command current Ic to generate $I_{COMMAND}$ for seek operations in the disk drive. To obtain the deration values for a seek operation from the table 95, the seek location (either start or destination), and seek length are utilized. Table 1 below is an example two-dimensional look-up matrix, for a data disk divided into four concentric zones for seek location, and three seek length ranges. Performing a seek operation includes obtaining the maximum current and velocity deration values, wherein seek information such as the starting and destination track are converted to the seek location and seek length, and a corresponding deration value is looked up in Table 1 by the process 94. Table 1 includes current deration values for Ic. Velocity deration values can be determined from current deration values because velocity and current are interdependent according to Relation 1 below:

$$\left. \begin{array}{l} Ic \sim a \\ V \sim (a)^{1/2} \end{array} \right\} \text{ whereby } V \sim (Ic)^{1/2}, \quad \text{(Relation 1)}$$

wherein a is acceleration and V is velocity.

As such, a deration value for target velocity corresponding to a deration value for command current is proportional to the square root of the current command deration value. In this manner, deration values for target velocity can be calculated using the deration values for current command (actuator current).

TABLE 1

Max Current Deration Values

| Seek Location | Seek Length (tracks) | | |
|---|---|---|---|
| | 0–400 | 400–3000 | More than 3000 |
| Zone 1 - Tracks 0–2000 | 60% | 80% | 80% |
| Zone 2 - Tracks 2001–4000 | 70% | 80% | 80% |
| Zone 3 - Tracks 4001–6000 | 90% | 90% | 100% |
| Zone 4 - Tracks 6001–8000 | 100% | 100% | 100% |

Thereafter, the deration values are applied to the current command Ic to generate the current command $I_{COMMAND}$, providing e.g. a maximum limit for actuator current and maximum transducer velocity for the seek operation. In Table 1, each deration value is less than or equal to one, and is multiplied by the current command Ic to provide the derated current command $I_{COMMAND}$. In another example, the deration value can be an upper limit for the current command Ic, wherein the current command Ic is set to equal the deration value to generate $I_{COMMAND}$ whenever Ic is greater than the deration value.

Figure 10:
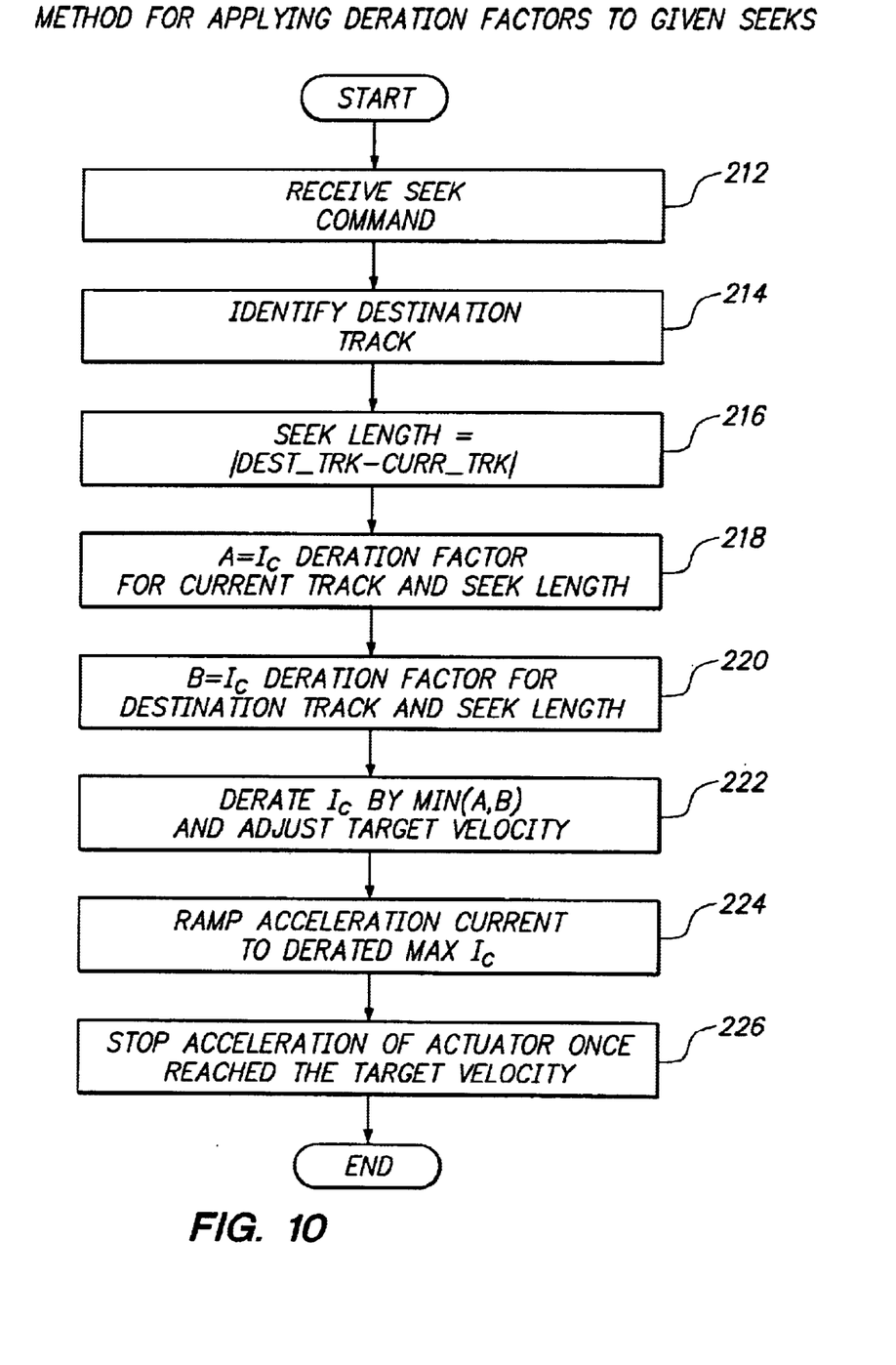
FIG. 10 shows a flow diagram of an embodiment of a process for applying deration values for seek operations according to the present invention.

FIG. 10 shows a flow diagram of an example of the above process for applying deration/constraint values for seek operations. Upon receiving a seek command to move the heads 32 (step 212), the destination track for the seek is identified (step 214). A seek length is determined as the difference in tracks between the current track (starting track) where the head 32 is and the destination track (step 216). A deration value A for Ic, corresponding to the seek length and the zone where the current track is located, is looked up in a deration table such as Table 1 (step 218). A deration value B for Ic, corresponding to the seek length and the zone where the destination track is located, is looked up in the deration table (step 220). Then Ic is derated by the minimum of the two deration values A and B, to generate $I_{COMMAND}$, and the target velocity is derated accordingly using a target velocity table or using Relation 1 above (step 222). Current 106 is applied to the actuator motor 36 according to $I_{COMMAND}$ to accelerate the heads 32, by shaping (ramping) the actuator current based on $I_{COMMAND}$ (derated Ic)(step 224), until the derated target velocity is reached whereupon the actuator current is adjusted to stop acceleration of the heads 32 (step 226). Thereafter, actuator current can be applied for the actuator to coast and/or decelerate the heads 32 to the destination track. For example, depending on the seek length, once the target velocity is reached, either Ic is applied to follow a deceleration trajectory, or first the actuator current is turned off to coast (zero acceleration) before entering into a deceleration state.

Application of current to the actuator motor 36 causes movement of the heads 32, such as by accelerating the heads 32. To achieve the desired acoustic output, maximum current applied to the actuator motor is derated (or limited to a constraint such as a maximum value) and a resulting maximum velocity is determined. The maximum actuator current is derated based on current deration factors (e.g. Table 1), and maximum target velocity is derated accordingly. In a well-tuned servo system, if maximum actuator current is derated by a factor of e.g. 70% (reduced to 70% of its original value), then target velocity is derated by a factor of about 84% (reduced to 84% of its original value) as square root of actuator current. To increase efficiency, two or more deration tables such as a current deration table (e.g. Table 1) and a velocity deration table can be stored in memory. The deration table for target velocity is similar in format to the deration table for actuator current, and velocity deration values can be calculated and stored in the velocity deration table in a similar fashion to that for the current deration values. For example, the velocity deration values can be calculated based on the current deration values in Table 1 according to Relation 1 above. The velocity deration values are accessed in a similar manner as the current deration values to control application of current to the actuator. Alternatively, each entry in Table 1 above can include a current deration value and a corresponding velocity deration value. Other structures for storing the deration values, and other access methods to the deration values are possible and contemplated by the present invention. In one example, the velocity deration table comprises a predetermined table of maximum target velocity deration factors such as e.g. Table 2 below. Each deration value in Table 2 is equal to the square root of a corresponding deration value in Table 1 for a given seek location (zone) and seek length.

TABLE 2

Max Target Velocity Deration Values

| Seek Location | Seek Length (tracks) | | |
|---|---|---|---|
| | 0–400 | 400–3000 | More than 3000 |
| Zone 1 - Tracks 0–2000 | 77% | 89% | 89% |
| Zone 2 - Tracks 2001–4000 | 84% | 89% | 89% |
| Zone 3 - Tracks 4001–6000 | 95% | 95% | 100% |
| Zone 4 - Tracks 6001–8000 | 100% | 100% | 100% |

In applying the target velocity deration values according to the flow diagram of FIG. 10, in step 222 once the current (Ic) deration factor is determined from the maximum current deration table.(e.g Table 1) according to min(A,B), then the corresponding entry in the target velocity deration table (e.g. Table 2) is obtained as the maximum target velocity deration factor. Derating by min (A,B) means, for example, if the starting track position and zone for a seek results in a 40% current deration factor according to a current deration table, and destination track and zone results in a 60% deration factor according to the current deration table, then the 40% factor is selected as smaller of the two values (resulting in a larger max current deration). Then the maximum target velocity deration table (e.g. Table 2) is accessed and a corresponding entry based on the selected current deration factor of 40% (i.e. starting track and zone) is selected as the maximum target velocity deration factor, and target velocity derated accordingly.

Although in the above examples and Tables 1 and 2, deration values for the actuator current and transducer target velocity have been utilized as control values, the present invention contemplates control values including for example: (1) constraints such as maximum values for the actuator current and target velocity in relation to seek length and location, and (2) selected levels for actuator current and target velocity in relation to seek length and location, Etc. to achieve desired seek acoustic output.

Seek acoustics are a major concern for consumer electronics manufacturers that utilize disk drives in their products. The data access patterns associated with certain functional features made possible by disk drives in consumer electronics, such as simultaneous record and playback (or dual streaming) in a digital video recorder deploying a disk drive, further exacerbate this problem. According to the present invention, perceptible seek acoustic noise in a disk drive is identified as a function of seek length and actuator stroke location (seek location), providing a solution that can take advantage of known patterns of access, such as in an AV disk drive 25, to minimize seek acoustics without sacrificing disk drive throughput. The prior art characterizes seek acoustics in the context of random seeks which may be relevant to computing applications. However, some AV disk drive access patterns (e.g. dual streaming) cause certain seeks of significantly higher acoustic noise than others, and prior art approaches achieving noise reductions as measured in random seeks do not meet the requirements of AV disk drive uses such as in consumer electronics. Achieving the lowest perceptible seek acoustic noise level may require degradation in seek performance, however such degradation need not necessarily lead to throughput degradations if performance deration is scaled by other data access overheads, such as by sector latencies as described further below.

Slew-rate limiting, or a substantially sinusoidal waveform, for the actuator current results in lower perceptible seek acoustics. Examples of such techniques are described in U.S. patent application Ser. No. 09/036,581, titled "Method and Apparatus for Performing an Open-loop Current Shaping for Seeking Acoustics Reduction in a Disk Drive", (now U.S. Pat. No. 6,148,240), incorporated herein by reference. Further examples of such technique are described in U.S. patent application Ser. No. 09/036,505, titled "Method and Apparatus for Performing Current Shaping for Seeking Acoustics Reduction in a Disk Drive", (now U.S. Pat. No. 6,256,163), incorporated herein by reference.

However, seeks of same length with the same actuator current shape/profile and settle characteristics but across different actuator stroke locations on the disks 30 can result in significantly different levels of acoustic noise. Therefore, addressing the shape of the actuator current commanded alone is not sufficient to achieve the best acoustic reduction. There are stroke dependent mechanical excitation sources of noise that do not necessarily impact the seek settling (e.g., z-direction vibrations). Such sources can be greatly reduced by limiting the actuator seek current and targeted maximum velocity.

To minimize impact on data throughput, seek information including seek length, stroke locations, and expected latency at the destination track, are utilized according to the present invention to derate the maximum seek current and targeted velocity, and the actuator current slew rate is controlled in such a way to not impact data throughput. In one embodiment, a lookup table 95 (e.g. Tables 1 and 2) of deration factors (or constraints), or a table of maximum seek currents and targeted velocities binned by the ranges of above seek information, is utilized. Real-time adjustments to the actuator current are also possible by monitoring the seek completion times relative to target block latencies. The latter approach can be used for e.g. a dual-stream access to an AV disk drive which requests many successive seeks of similar fixed length.

Disk drives in AV applications have enabled implementation of new features in consumer electronics, such as digital video recorders. However, certain features such as broadcast pause and simultaneous record/playback require exercising the disk drive in modes resulting in high seek acoustics. Large partitions of AV data are allocated by the file-system manager and multiple-stream access modes require performing long seeks between these partitions. Often, successive seeks are repetitive in length, and latencies involved in transitioning between partitions provide an opportunity to achieve significant acoustic reduction using the deration methods described herein.

Further acoustic reduction can be achieved by using latency-scaled performance deration. The conventional methods of moving the heads 32 to a destination track as fast as possible, and then waiting there for a rotational latency period until the target block on the destination track moves under the head 32 is inefficient and increases acoustic output. According to an aspect of the present invention, the expected latency at a destination track is utilized to control (e.g., derate) actuator current and transducer target velocity to move the heads 32 only as fast as necessary to arrive at the destination track so that the target block is ready under the head for reading/writing.

For example, in a typical disk drive, "short" seeks (e.g. 51 to 199) are acoustically louder than "linear" seeks (e.g. 6–50 tracks), and "long" seeks (200 or more tracks) are acoustically louder than short seeks. There is a strong correlation between the actuator current shape (profile) and seek acoustics. A tighter PWM slew rate limit controlling the change in the commanded control current ($I_{COMMAND}$) from one servo sample (i.e. servo sector) to another sample results in smoother (more sinusoidal) current shape and improved seek acoustics for all seek lengths. An overly tight ramp resulting in undershoots/overshoots and a triangular/trapezoidal current profile ultimately affects seek performance and still results in further acoustic improvements.

In an example implementation, there can be a strong correlation between improved current shape and reduction in the acoustic energy in the 1.6–2.1 KHz range. For very similar actuator current profiles and servo performance, certain seek strokes (seek locations) are significantly louder proximate the outer diameter (OD) of the data disk 30, than proximate the middle diameter (MD) or the inner diameter (ID) of the disk 30. For example, seeks of a few hundred tracks result in much more energy input to the actuator 29 (e.g., in the 1.6–2.1 KHz range) when performed at the OD of the disk 30 rather than the MD or ID of the disk 30. As such, seeks at the OD of the disk 30 due to broadcast-pause can be very loud. This is due to possible mechanical excitation at the OD of the disk 30 (magnetic plate/coil). In general, compared to spin-only mode, random seeks result in increased acoustic energy in e.g. 100–500 Hz and 1.6–2.1 KHz range.

According to an embodiment of the present invention, limiting the maximum actuator current and maximum transducer velocity during a seek operation (i.e. lowering the amount of energy put into the actuator) in addition to controlling the actuator current shape results in reduced drive acoustic output. For random seeks, this improvement coincides with reducing the acoustic energy in e.g. 100–500 Hz as well as 1.6–2.1 KHz rage. For seeks of a few hundred tracks at OD of the disk 30, the improvement coincides with acoustic energy reduction in e.g. 1.6–2.1 KHz range.

In one example embodiment, two modes for improving (e.g. lowering) the disk drive seek acoustics can be utilized. Both modes can be implemented by changes in the servo system 56 configuration, or by code enhancements in the servo firmware. In the first mode, the actuator current shape (profile) is controlled as described above to improve seek acoustics without significantly impacting the disk drive performance. In one example, controlling the actuator current shape includes a tighter PWM slew rate limit and lower maximum target velocity. Such current shape control can also be based on seek lengths.

In the second mode, further acoustic improvements are achieved by minimizing excitation of the disk drive 25 mechanics and by not amplifying current-driven noise (deviations from a non-sinusoidal actuator current profile at lower current levels are acoustically less disturbing). This can be achieved by derating (limiting) the maximum actuator current, further lowering the maximum target velocity, and using the PWM slew rate limit of the first mode. In the second mode, random seek performance may be degraded, however because single-track seek times are not affected, sequential throughput is not affected and the effect on random throughput depends on the access pattern. The servo system/circuit 56 can include configuration bits that can switch the disk drive into either of the above twp modes by enabling/disabling the above deration. The appropriate mode can be selected based on a desired, acoustic vs. throughput performance tradeoffs for the disk drive 25.

The servo system/controller 56 can comprise a logic circuit configured by program instructions implementing the steps performed by servo controller 56 as detailed above. The logic circuit can be implemented as an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in the chip rather than using an instruction set requiring multiple clock cycles to execute. An ASIC is typically fabricated using CMOS technology with custom, standard cell, physical placement of logic (PPL), gate array, or field programmable gate array (FPGA) design methods. Alternatively, the servo controller 56 can comprise a microprocessor interconnected to a memory storing said program instructions for execution by the microprocessor. Similarly, the microcontroller 66 can comprise a logic circuit such as ASIC configured by program instructions implementing the steps performed by the microcontroller 66 as detailed above. Alternatively, the microcontroller 66 can comprise a microprocessor interconnected to a memory storing said program instructions for execution by the microprocessor.

A disk drive 25 according to the present invention allows organizing and allocation of disk drive capacity when used to store and retrieve isochronous Audio-Video (AV) content for consumer electronics applications. Such a disk drive 25 can also be useful when managing multiple AV streams over multiple content objects in a full and fragmented disk drive. The present invention is not dependent on any particular interface, and can be implemented on e.g. ATA, SCSI, and 1394. The latter under FCP-AVIC with an on board Stream Manager and Embedded File System will derive additional benefits from the present invention, e.g. for content objects used for delay broadcast applications.

Figure 11:
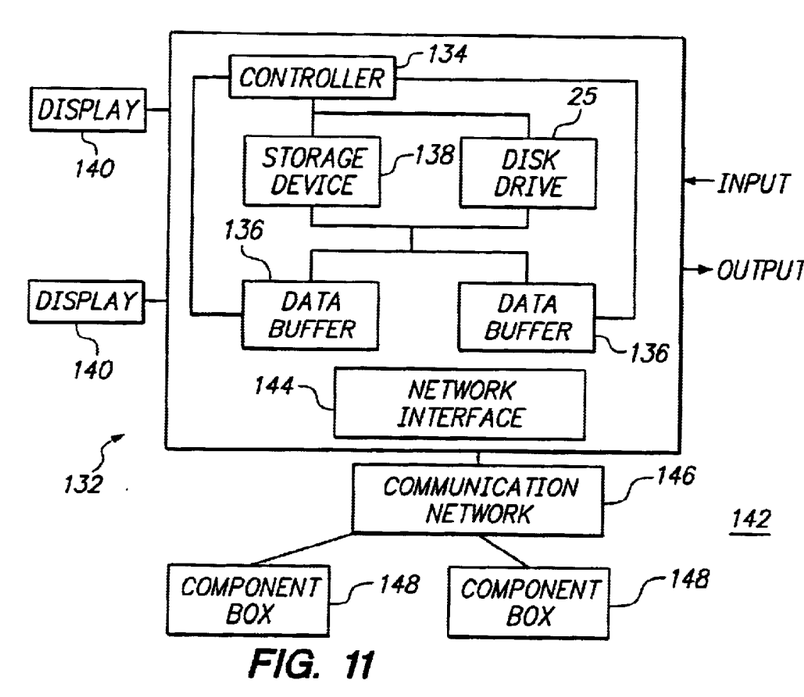
FIG. 11 shows an example block diagram of and AV storage server and AV system according to another aspect of the present invention.

As such, the system 10 in FIG. 1 can be a component of an AV system such as audio/video consumer electronics, wherein the disk drive 25 can be utilized as an AV storage server for storage of audio-visual content. The disk drive 25 can support a file system of audio visual material such as video titles. The disk drive 25 can also be used for recording and playback of AV broadcasts over cable, for example. FIG. 11 shows a block diagram of an example AV storage server 132 according to the present invention. The AV storage server 132 includes a controller 134, at least one buffer memory 136 and one or more storage devices 138 such as disk drives 25. The disk drives 25 can store AV information for various video titles such as movies. The controller 134 controls the reading and writing of data to the disk drives 25. AV data read from one or more of the disk drives 25 can be output from the AV storage server for display on a display 140 connected to the AV storage server 132. Each disk drive 25 can simultaneously or sequentially provide AV information to one or more AV streams output from the AV storage server 132. Further, incoming AV data into the AV storage server 132 (e.g. from a cable or over a network) can be stored onto one or more of the disk drives 25. Each disk drive 25 can simultaneously or sequentially store AV information from one or more AV streams incoming into the AV storage server 132.

Given disk drive data rates and seek times on the one hand, and compressed AV data rates on the other, it is possible for a single disk drive to service more than one AV stream. For example, record one program into one disk partition while playing another program from another disk partition. This can be accomplished by defining partition access units and buffering in the disk drive and the host system.

The AV storage server 132 can be a component of an AV system 142 according to the present invention, wherein the AV system 142 comprises said AV storage 132 including an interface unit 144, a wired communication network 146 and component boxes 148 such as consumer electronics equipment. The AV system 142 can be a part of a home network system with connection to external cable or network for receiving AV information. One or more component boxes 148 can receive AV content from one or more disk drives 25 in the AV server 132. AV data is read from the disks in the disk drives 25 to produce data streams which are transmitted to component boxes 148 or displays 140 for viewing. Further, one or more component boxes 148 can provide AV content to one or more disk drives 25 in the AV server 132. The data streams can comprise sequences of discrete fragments of data which are periodically transmitted in bursts so that over time a constant stream of data is transmitted. The data stream can be smoothed out using the buffer memory 146. In one example, each burst of video data can correspond to about 0.5 to 1.0 second of video for a magnetic disk drive 25. In another example, each burst of video data can correspond to about 0.25 sec. of video at 4 Mbs (Mega Bits per Second) compressed video rate and 255 sectors per transfer (drive access units). The system 10 can also be a component of a computer system such a personal computer, wherein the disk drive is utilized for storage of data.

The present invention has been described in considerable detail with reference to certain preferred versions thereof; however, other versions are possible. Therefore, the spirit and scope of the appended claims should not be limited to the description of the preferred versions contained herein.

What is claimed is:

1. In a disk drive including at least one data disk having multiple concentric data tracks thereon for storing data, and a transducer radially moveable relative to said data tracks by an actuator during a seek operation from a starting track to a destination track in response to controlled application of current to the actuator based on a seek profile, a method for determining the seek profile for one or more seek operations, comprising the steps of:

(a) for a seek operation from a starting track to a destination track, determining an actuator current control value such that in response to controlled application of current to the actuator as a function of the current control value the acoustic output from the disk drive is at or below a desirable level; and (b) storing the current control value in a memory device in relation to the seek length and location, wherein the seek length represents the distance between the starting and destination tracks, and the seek location represents the radial locations of the starting and destination tracks;

wherein the current control value can thereafter be used to perform seek operation in the disk drive.

2. The method of claim 1, wherein:

step (a) further includes the steps of determining a transducer target velocity control value such that in response to controlled application of current to the actuator as a function of the target velocity control value the acoustic output from the disk drive is at or below a desirable level; and step (b) further includes the steps of storing the target velocity control value in a memory device in relation to the seek length and location, wherein the velocity control value can thereafter be used to perform seek operation in the disk drive.

3. The method of claim 1, wherein said current control value represents a current deration value for the actuator current during a corresponding seek operation.

4. The method of claim 1, further comprising the steps of, for a seek operation from a starting track to a destination track:
- (c) determining the seek length and the seek location from said starting and destination tracks;
- (d) using the seek length and seek location to obtain a corresponding current control value from the memory device; and
- (e) controlling application of current to the actuator as a function of said current control value.

5. The method of claim 2, wherein said target velocity control value represents velocity deration value for the transducer target velocity during a corresponding seek operation.

6. The method of claim 2, further comprising the steps of, for a seek operation from a starting track to a destination track:
- (c) determining the seek length and the seek location from said starting and destination tracks;
- (d) using the seek length and seek location to obtain corresponding current and target velocity control values from a memory device; and
- (e) controlling application of current to the actuator as a function of the current and target velocity control values.

7. The method of claim 1, further comprising the steps of performing steps (a)–(b) for a plurality of seek operations; wherein step (b) further includes the steps of relating each current control value to the corresponding seek length and location, and then storing each current control value in the memory device in relation to the corresponding seek length and location.

8. The method of claim 1, wherein step (a) further includes the steps of:
- (i) selecting an empirical current control value;
- (ii) performing controlled application of current to the actuator as a function of the empirical current control value;
- (iii) examining the acoustic output of the disk drive in response to said controlled application of current, by comparing said acoustic output to a desired acoustic output; and
- (iv) repeating steps (i)–(iii) until application of actuator current as a function of a selected empirical current control value achieves the desired acoustic output.

9. The method of claim 1 wherein the data stored in said data tracks comprises audio video data.

10. The method of claim 1, wherein step (b) further includes the steps of determining the seek length and seek location from the starting and the destination tracks, and associating the current control value to the seek length and seek location.

11. The method of claim 2, wherein step (b) further includes the steps of determining the seek length and seek location from the starting and the destination tracks, and associating the target velocity control value to the seek length and seek location.

12. The method of claim 1, wherein said current control value represents maximum actuator current level for the actuator current during a corresponding seek operation.

13. The method of claim 12, wherein said target velocity control value represents maximum target velocity for the transducer during a corresponding seek operation.

14. The method of claim 1 wherein the disk drive is a component of an audio video system.

15. In a disk drive including at least one data disk having multiple concentric data tracks thereon for storing data, and a transducer radially moveable relative to said data tracks by an actuator during a seek operation from a starting track to a destination track, a method for performing seek operations comprising the steps of:
- (a) receiving a request for a seek from starting track to a destination track;
- (b) using a seek profile for controlled application of current to the actuator based on the seek profile, wherein the seek profile includes one or more actuator current level control values based on radial location of said starting and destination tracks on the data disk, such that in response to controlled application of current to the actuator as a function of the current control values the acoustic output from the disk drive is at or below a desirable level; and
- (c) applying current to the actuator as a finction of the current control values to perform the seek operation.

16. The method of claim 15, wherein:
- the seek profile further includes one or more transducer target velocity control values based on radial location of said starting and destination tracks on the data disk, such that in response to controlled application of current to the actuator as a function of the target velocity control values the acoustic output from the disk drive is at or below a desirable level; and
- step (c) further includes the steps of applying current to the actuator as a function of the current control values to perform the seek operation.

17. The method of claim 15, wherein the current control values represent deration values for the actuator current for a seek operation.

18. The method of claim 16, wherein the target velocity control values represent deration values for the transducer target velocity for a seek operation.

19. The method of claim 16, wherein the current and velocity control values are arranged in relation to seek length and seek location for each seek operation, wherein the seek length represents the distance between the starting and destination tracks, and the seek location represents the radial locations of the starting and destination tracks.

20. The method of claim 19, wherein step (b) further comprises the steps of:
- determining a seek length and location from the starting and destination tracks for a seek request; and
- obtaining corresponding current control values for the seek request from the seek profile using the seek length and location.

21. The method of claim 19, wherein step (b) further comprises the steps of:
- determining a seek length and location from the starting and destination tracks for a seek request; and
- obtaining corresponding target velocity control values for the seek request from the seek profile using the seek length and location.

22. The method of claim 15, wherein the disk drive is a component of an audio video system, and the data stored in said data tracks comprises audio video data.

23. A disk drive apparatus comprising:
- at least one data disk having multiple concentric data tracks thereon for storing data;
- an actuator including an actuator motor;
- a transducer radially moveable relative to said data tracks by the actuator;

a servo system including a seek profile, for generating actuator current commands to perform a seek operation from a starting track to a destination track according to the seek profile, wherein the seek profile includes one or more actuator current control values based on radial location of the starting and destination tracks on the data disk, such that in response to controlled application of current to the actuator as a function of the actuator current control values the acoustic output from the disk drive is at or below a desirable level; and a driver coupled to the servo system and the actuator motor, wherein the driver receives at least one current command to generate an input current waveform to the actuator motor.

24. The disk drive apparatus of claim 23, wherein the current control values represent deration values for actuator current for a seek operation.

25. The disk drive apparatus of claim 23, wherein the seek profile further includes one or more transducer target velocity control values based on radial location of said starting and destination tracks on the data disk, such that in response to controlled application of current to the actuator as a function of the target velocity control values the acoustic output from the disk drive is at or below a desirable level.

26. The disk drive apparatus of claim 25, wherein the target velocity control value represents deration values for the transducer target velocity for a seek operation.

27. The disk drive apparatus of claim 25, wherein the current and velocity control value are arranged in relation to seek length and seek location for each seek operation, wherein the seek length represents the distance between the starting and destination tracks, and the seek location represents the radial locations of the starting and destination tracks.

28. The disk drive apparatus of claim 23, wherein the servo system further includes a controller for generating current commands as a function of said current control values for controlled application of current to the actuator.

29. The disk drive apparatus of claim 25, wherein the servo system further includes a controller for generating current commands as a function of said current and target velocity control values for controlled application of current to the actuator.

30. The disk drive apparatus of claim 29, wherein the controller includes a command generator that determines the seek length and the seek location from said starting and destination tracks, and utilizes the seek length and seek location to obtain corresponding current and velocity control values from the seek profile to generate current commands for controlling application of current to the actuator as a function of said control values.

31. The disk drive apparatus of claim 23, wherein the data stored in said data tracks comprises audio video data.

32. An audio video (AV) system comprising:

a disk drive including: (i) at least one data disk having multiple concentric data tracks thereon for storing audio video data; (ii) an actuator including an actuator motor; (iii) a transducer radially moveable relative to said data tracks by the actuator; (iv) a servo system including a seek profile, for generating actuator current commands to perform at least one seek operation from a starting track to a destination track according to the seek profile, the seek profile including one or more actuator current control values based on radial location of the starting and destination tracks on the data disk, such that in response to controlled application of current to the actuator as a function of the actuator current control values the acoustic output from the disk drive is at or below a desirable level; and (v) a driver coupled to the servo system and the actuator motor, wherein the driver receives at least one current command to generate an input current waveform to the actuator motor; and an AV controller interconnected to the disk drive for storing audio video data in the disk drive, and for retrieving data from the disk drive.

33. The AV system of claim 32, wherein the current control values represent deration values for the actuator current level for a seek operation.

34. The AV system of claim 32, wherein the seek profile further includes one or more transducer target velocity control values based on radial location of said starting and destination tracks, such that in response to controlled application of current to the actuator as a function of the target velocity control values the acoustic output from the disk drive is at or below a desirable level.

35. The AV system of claim 34, wherein the target velocity control values represent deration values for transducer target velocity for a seek operation.

36. The AV system of claim 34, wherein the current and velocity control value are arranged in relation to seek length and seek location for each seek operation, wherein the seek length represents the distance between the starting and destination tracks, and the seek location represents the radial locations of the starting and destination tracks.

37. The AV system of claim 32, wherein the servo system further includes a servo controller for generating current commands as a function of said current control values for controlled application of current to the actuator.

38. The AV system of claim 34, wherein the servo.system further includes a controller for generating current commands as a function of said current and target velocity control values for controlled application of current to the actuator.

39. The AV system of claim 38, wherein the servo controller includes a command generator that determines the seek length and the seek location from said starting and destination tracks, and utilizes the seek length and seek location to obtain corresponding current and target velocity control values from the seek profile to generate current commands for controlling application of current to the actuator as a function of said control values.

40. The AV system of claim 38, wherein the AV controller further includes means for controlling transmission of AV data to and from the disk drive.

41. The AV system of claim 38, wherein the controller further comprises means for receiving one or more incoming data streams and partitioning each incoming data stream into data segments for storage in the disk drive.

42. The AV system of claim 38, wherein the controller further comprises means for combining data segments read from the disk drive to reformulate one or more output data streams.

* * * * *